Figure 1:
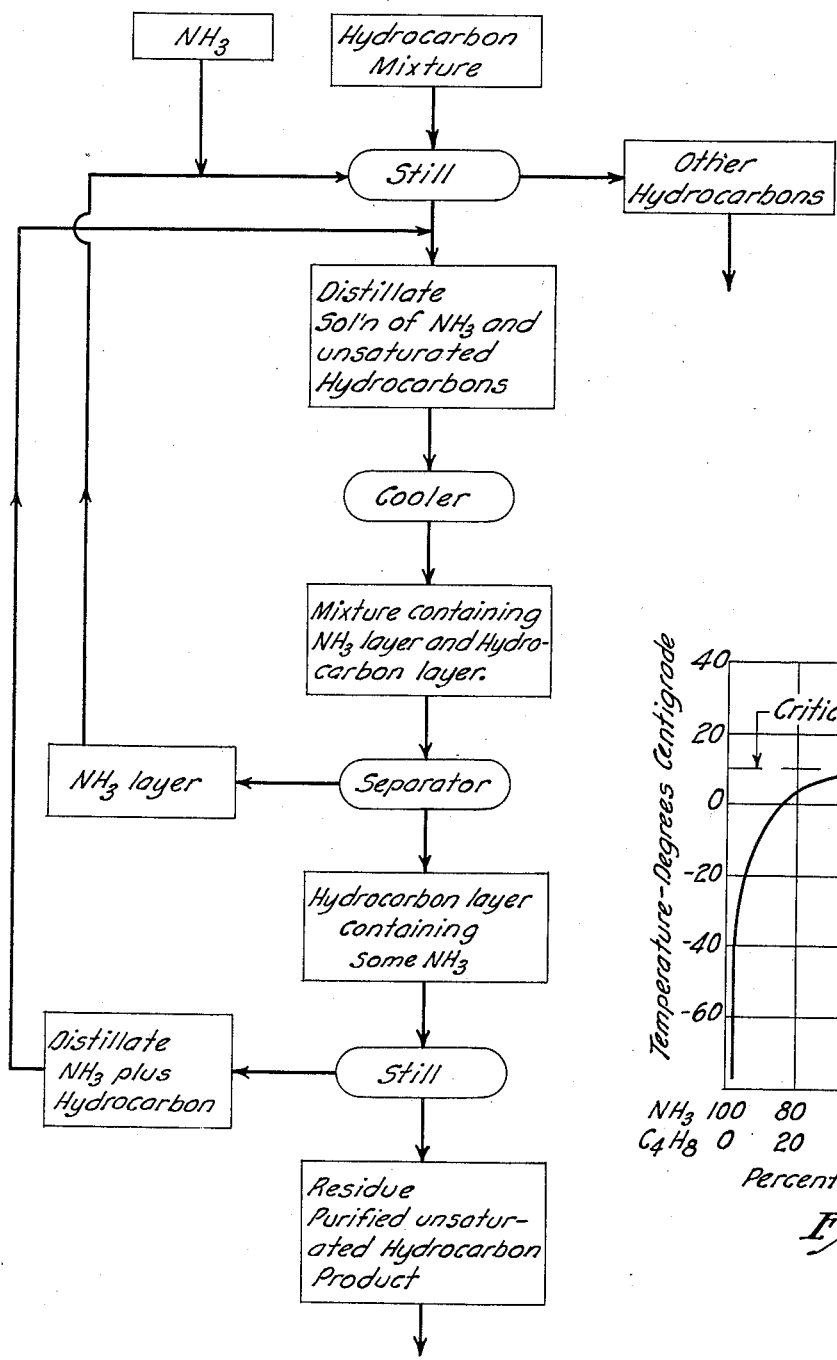

Patented Feb. 20, 1945

2,370,063

UNITED STATES PATENT OFFICE 2,370,063

SEPARATION OF UNSATURATED ALIPHATIC HYDROCARBONS FROM SOLUTIONS THEREOF IN AMMONIA

Howard S. Nutting and Lee H. Horsley, Midland, Mich., assignors to The Dow Chemical Company, Midland, Mich., a corporation of Michigan Application April 17, 1940, Serial No. 330,204

5 Claims. (Cl. 202—42)

This invention concerns a method of separating an unsaturated aliphatic hydrocarbon containing 3 or more carbon atoms in its molecule from a solution thereof with liquid ammonia which permits recovery of both the hydrocarbon and the ammonia in concentrated form. It particularly concerns such separation of olefines and diolefines containing from 4 to 6 carbon atoms in the molecule from their solutions with ammonia.

In our co-pending application, Serial No. 287,218, filed July 29, 1939, of which this application is a continuation-in-part, we have disclosed a simplified method of separating individual unsaturated aliphatic hydrocarbons from complex mixtures of such hydrocarbons, e. g. cracked-oil gas, which involves subjecting the complex hydrocarbon mixture to repeated distillations, alternately in the presence and in the absence of ammonia. Such distillation with ammonia results in formation of azeotropic mixtures of ammonia with various of the individual hydrocarbons present, and thereby permits fractionation from one another of hydrocarbons which cannot readily be separated by ordinary distillation in the absence of ammonia. As fractions of distillate from such distillation, there are obtained solutions of the concentrated, or individual, unsaturated hydrocarbons in liquid ammonia. Since the solutions are obtained by azeotropic distillation, the hydrocarbon cannot conveniently be separated from the ammonia by redistillation. It may of course be recovered by washing the ammonia therefrom with water, but this results in dilution of the ammonia and renders the latter unsuitable for direct return to the distillation. An object of this invention is to provide a simple method of separating an unsaturated hydrocarbon from a solution thereof in liquid ammonia which permits recovery of the latter in a concentrated form suitable for reemployment in the above-described distillation to facilitate the fractionation of individual unsaturated hydrocarbons from hydrocarbon mixtures. Other objects will be apparent from the following description of the invention.

We have found that the liquid solutions of ammonia and unsaturated hydrocarbons containing 3 or more carbon atoms in the molecule which are obtained by distilling such hydrocarbons with liquid ammonia are capable of existence as homogeneous solutions only above certain temperatures and that any such solution may be broken to form two distinct phases, i. e. a phase consisting predominantly of ammonia and another phase consisting predominantly of the hydrocarbon, by cooling the same to a temperature below that at which the homogeneous solution is stable. After breaking the solution in such manner, the hydrocarbon phase and the ammonia phase of the mixture may mechanically be separated from one another.

The unsaturated hydrocarbons containing less than 5 carbon atoms to the molecule are of lower density than liquid ammonia; hence on cooling a solution of such hydrocarbon and liquid ammonia sufficiently to cause separation of ammonia, the latter forms a lower layer which may be removed from the upper hydrocarbon layer. The unsaturated hydrocarbons having more than 5 carbon atoms to the molecule are of greater density than ammonia; hence on cooling a solution of any such hydrocarbon and ammonia, the latter forms an upper layer which may be separated from the lower hydrocarbon layer. On the other hand, the unsaturated aliphatic hydrocarbons containing 5 carbon atoms to the molecule have nearly the same density as liquid ammonia. When a solution of such hydrocarbon and ammonia is cooled sufficiently to break the solution, a heterogeneous liquid mixture of ammonia and the hydrocarbon is usually formed. This mixture may in some instances be separated into its components by passage through a centrifuge. However, it is most conveniently treated with a trace of water or other liquid, e. g. ethylene glycol, kerosene, heptane, octane, or other relatively high boiling paraffin hydrocarbon, etc., which is soluble in one of the components of the mixture, and which, when dissolved in the component, changes its density sufficiently to cause formation of distinct layers of the hydrocarbon and the ammonia which may then be separated.

The mechanical separation of ammonia from the unsaturated hydrocarbon by the foregoing procedures is seldom entirely complete; i. e. the hydrocarbon layer which is separated usually retains a small proportion of dissolved ammonia, and the ammonia layer usually has a small proportion of the hydrocarbon dissolved therewith. We have found that the ammonia remaining in the hydrocarbon layer may be removed by distilling only a small portion of said layer, thus leaving the bulk of the hydrocarbon in a purified form free of ammonia. The solution of ammonia and hydrocarbon obtained as the distillate may be recycled in the process as just described.

If desired, the small proportion of hydrocarbon retained in the ammonia layer after the above-described mechanical separation may similarly be distilled from said layer together with a portion of the ammonia to leave the bulk of the ammonia substantially pure. However, the presence of a small proportion of the hydrocarbon in the ammonia does not interfere with reemployment of the latter as an agent for facilitating the fractional distillation of closely related unsaturated hydrocarbons from one another and said layer is usually returned to such distillation without removing the hydrocarbon dissolved therewith.

The invention, then, comprises the steps of cooling a solution of an unsaturated aliphatic hydrocarbon and ammonia to a temperature sufficient to break the solution, thereafter mechanically separating ammonia from the hydrocarbon, and distilling a portion of the latter to remove residual ammonia therefrom. Figure 1 of the accompanying drawing is a flow sheet illustrating the flow of materials and the sequence of steps in the process as just described.

The temperature below which a solution of ammonia and an unsaturated aliphatic hydrocarbon containing 3 or more carbon atoms must be cooled in order to cause separation of ammonia from the hydrocarbon varies with change in the kind and proportion of hydrocarbon present, but is in most instances a temperature readily obtainable by known procedures. The solutions of ammonia and such hydrocarbon which contain from 40 to 60 per cent, or thereabout, of each ingredient, upon cooling are, in most instances, converted into mechanical mixtures, i. e. into distinct phases, at higher temperatures than when they contain the ingredients in other proportions. The solution of ammonia and a hydrocarbon of composition such that it changes to a mechanical mixture at a higher temperature than do solutions of the same ingredients in any other proportions is herein referred to as the "critical solution" and the temperature at which it changes, upon cooling, from a homogeneous solution to a mechanical mixture is termed the "critical solution temperature." Also, the critical solution is referred to as being of "critical composition."

Figure 2:
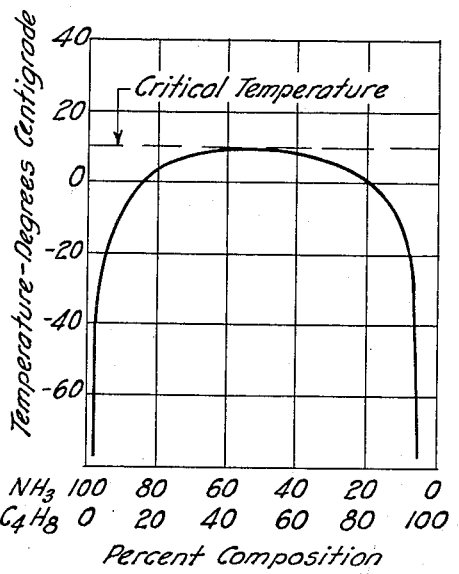

Figure 2 of the drawing is a phase diagram giving the mutual solubility values which we have found for mixtures of ammonia and butylene-1 at different temperatures. The following are the measured values from which the diagram was drawn.

*Table I*

| Temp., ° C. | Per cent by wt. of NH$_3$ in— | |
|---|---|---|
| | NH$_3$ layer | Butylene layer |
| 10 [1] | Between 45 and 55 | Between 45 and 55 |
| 0 | 85 | 10 |
| −20 | 95 | 7 |
| −40 | 98 | 6 |
| −78 | 98 | 5 |

[1] Approx. critical solution temp.

In Fig. 2, all values above the curve represent homogeneous solutions and the curve itself represents the temperatures at which solutions of different ammonia content separate into distinct phases upon cooling and the compositions of the phases so formed.

The solubility curves for systems of ammonia with other unsaturated aliphatic hydrocarbons containing 3 or more carbon atoms in the molecule, e. g. propylene, propadiene, methyl acetylene, butylene-2, isobutylene, ethyl-acetylene, vinyl-acetylene, amylenes, pentadienes, pentynes, hexylenes, hexadienes, hexynes, etc., are of similar shape to that shown in Fig. 2, although of different numerical values. The following table gives the critical solution temperatures which we have determined for a number of systems of anhydrous ammonia and unsaturated aliphatic hydrocarbons. It names the hydrocarbon present in each system and gives the approximate critical solution temperature for each system.

*Table II*

| Hydrocarbon ingredient | Critical solution temp, °C. |
|---|---|
| Propylene | −8 |
| Methyl-acetylene | <−78 |
| Butylene-1 | 10 |
| Butadiene-1.3 | −31 |
| Vinyl-acetylene | <−78 |
| Amylene-1 | 22 |

From Table II, it will be seen that the temperature to which a critical solution of ammonia and an acetylenic hydrocarbon must be cooled in order to cause separation of an ammonia layer and a hydrocarbon layer is lower than that to which the critical solution of ammonia and a diolefine containing the same number of carbon atoms as the acetylenic hydrocarbon must be cooled in order to effect similar separation of distinct phases. Also, the temperature required to break a critical solution of ammonia and a diolefine into distinct phases is somewhat lower than that required to break a critical solution of ammonia and an olefine containing the same number of carbon atoms as the diolefine. It will also be seen that the temperatures required to break the critical solutions of ammonia and hydrocarbons of a given series, e. g. the acetylene series, or the diolefine series, or the olefine series, becomes higher as the molecular weight of the hydrocarbon ingredient is increased.

The solutions of ammonia and aliphatic hydrocarbons may be resolved into distinct phases at temperatures higher than those indicated in Tables I and II by treating the same with a substance which is readily soluble in one component of the solution, but not in the other component. Examples of substances which may be used for such purpose are water, ethylene glycol, kerosene, etc. In most instances only a small proportion of such substance need be added to raise markedly the temperature at which the solution breaks into distinct phases. For instance, although the solutions of anhydrous ammonia and methyl-acetylene or vinyl-acetylene have critical solution temperatures below −78° C., the addition of 5 per cent by weight of water to either such solution raises its critical solution temperature to above room temperature. The ammonia layer which separates from the solution upon cooling the latter contains the added water. However, its presence does not interfere seriously with subsequent employment of the ammonia as an agent for facilitating the separation of aliphatic hydrocarbons from one another by fractional distillation therewith. Although the temperature at which a given solution of ammonia and an unsaturated hydrocarbon separates into distinct phases is quite sharp, the proportion of ammonia retained in the hydrocarbon layer, and also the proportion of hydrocarbon retained in the ammonia layer, becomes smaller with further cooling of the mixture.

The following example describes one way in which the principle of the invention has been applied, but is not to be construed as limiting its scope.

Example

A fraction of cracked oil gas which comprised butylene and butadiene was fractionally distilled in the presence of anhydrous ammonia at superatmospheric pressure to obtain a fraction of distillate containing approximately 20 per cent by weight of ammonia and 80 per cent of butylene. Approximately 1478 grams of this fraction of distillate, which was collected under pressure in the form of a homogeneous solution, was cooled in a bath of solid carbon dioxide and acetone to a temperature of −78° C., whereby two layers were formed, i. e. an upper layer of ammonia and a lower layer of butylene. The two layers were separated. The butylene layer weighed 1182 grams and retained approximately 1.6 per cent by weight of dissolved ammonia. It was fractionally distilled at a pressure of approximately 125 pounds per square inch to obtain, as the first fraction, 79 grams of a mixture consisting of 60 grams of butylene and 19 grams of ammonia, and, as a second fraction, 69 grams of butylene which was substantially free of ammonia. As residue from the distillation there was obtained 1000 grams of purified butylene, making a total of 1069 grams of ammonia-free butylene obtained.

Although the present invention is particularly applicable in separating ammonia and an unsaturated hydrocarbon from a solution thereof obtained by distilling the hydrocarbon together with ammonia, it is not restricted thereto. It may be applied in separating ammonia and an unsaturated hydrocarbon from such solution, regardless of how the latter is obtained, provided that the solution to be separated contains a substantial proportion, e. g. from 10 to 90 per cent by weight, of each of the ingredients ammonia and the hydrocarbon.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for separating ammonia and an unsaturated aliphatic hydrocarbon containing at least three carbon atoms in the molecule from a liquid solution thereof, the steps which consist in cooling the solution to a temperature at which it separates into a phase consisting for the most part of ammonia and another phase consisting for the most part of the hydrocarbon, removing the ammonia phase from the hydrocarbon phase and distilling residual ammonia from the hydrocarbon phase together with a portion of the hydrocarbon to leave the major portion of the hydrocarbon in form substantially free of ammonia.

2. A method which comprises cooling a liquid solution of substantially anhydrous ammonia and an unsaturated aliphatic hydrocarbon containing four carbon atoms in the molecule to a temperature at which it separates into a lower layer consisting for the most part of ammonia and an upper layer consisting for the most part of the hydrocarbon, removing the ammonia layer from the hydrocarbon layer, and distilling a portion of the latter to remove residual ammonia therefrom together with a portion of the hydrocarbon, leaving the major portion of the hydrocarbon in a form substantially free of ammonia.

3. A method which comprises cooling a liquid solution of substantially anhydrous ammonia and a butylene to a temperature at which it forms an upper layer consisting for the most part of butylene and a lower layer consisting for the most part of ammonia, removing the ammonia layer from the butylene layer, and distilling a portion of the latter to remove residual ammonia therefrom together with a portion of the butylene, leaving the major portion of the butylene in a form substantially free of ammonia.

4. A method which comprises cooling a liquid solution of substantially anhydrous ammonia and butylene-1 to a temperature at which it forms an upper layer consisting for the most part of the butylene and a lower layer consisting for the most part of ammonia, removing the ammonia layer from the butylene layer, and distilling a portion of the latter to remove residual ammonia therefrom together with a portion of the butylene, leaving the major portion of the butylene in a form substantially free of ammonia.

5. A method which comprises cooling a liquid solution of substantially anhydrous ammonia and butadiene to a temperature at which it separates into an upper layer consisting for the most part of butadiene and a lower layer consisting for the most part of ammonia, removing the ammonia layer from the butadiene layer, and distilling a portion of the latter to remove residual ammonia therefrom as an azeotrope with a portion of the butadiene, leaving the major portion of the butadiene in a form substantially free of ammonia.

HOWARD S. NUTTING.
LEE H. HORSLEY.